(12) United States Patent
Good et al.

(10) Patent No.: US 7,047,822 B2
(45) Date of Patent: May 23, 2006

(54) DEVICES, INSTALLATIONS AND METHODS FOR IMPROVED FLUID FLOW MEASUREMENT IN A CONDUIT

(75) Inventors: Fred P. Good, Boulder, CO (US); Eric J. Harman, Boulder, CO (US); Thomas A. Balu, Longmont, CO (US)

(73) Assignee: Veris, Inc., Niwot, CO (US)

( * ) Notice: Subject to any disclaimer, the term of this patent is extended or adjusted under 35 U.S.C. 154(b) by 0 days.

(21) Appl. No.: 10/939,150

(22) Filed: Sep. 13, 2004

(65) Prior Publication Data

US 2006/0053902 A1    Mar. 16, 2006

(51) Int. Cl.
*G01F 1/37* (2006.01)

(52) U.S. Cl. .................................................. 73/861.52

(58) Field of Classification Search ............. 73/861.63, 73/861.52
See application file for complete search history.

(56) References Cited

U.S. PATENT DOCUMENTS

| | | | |
|---|---|---|---|
| 1,126,275 A | 1/1915 | Rice | |
| 3,196,680 A | 7/1965 | Curran | |
| 3,374,673 A * | 3/1968 | Trageser | .................. 73/204.21 |
| 4,638,672 A | 1/1987 | McCall | |
| 5,265,478 A * | 11/1993 | McKay et al. | ........... 73/861.63 |
| 6,314,821 B1 * | 11/2001 | Allan | ...................... 73/861.52 |
| 6,474,177 B1 * | 11/2002 | Maeda et al. | ............ 73/861.63 |

* cited by examiner

*Primary Examiner*—Jewel V. Thompson
(74) *Attorney, Agent, or Firm*—Harold A. Burdick (57) ABSTRACT

Differential pressure measurement devices, installations and methods are disclosed, the devices including a main body and retainer. The main body is characterized by a front portion having a substantially constant curvilinear flow facing front surface, a rear portion, and a substantially constant diameter portion between the front portion and the rear portion. The rear portion includes relatively larger and smaller diameter termini. The installation of this invention is maintained in a fluid flow containing conduit and includes a pipe section affixed between sections of the conduit. The device is concentrically located in the otherwise unobstructed flow path defined by the pipe section, with the device retainer downstream of all measurement ports, and obstructs fluid flow thereat to establish annular flow therearound having predictable characteristics.

23 Claims, 8 Drawing Sheets

Flow Rate (Turndown = Max. flow/Min. flow)

DEVICES, INSTALLATIONS AND METHODS FOR IMPROVED FLUID FLOW MEASUREMENT IN A CONDUIT

FIELD OF THE INVENTION

This invention relates to fluid flow measurement systems, and, more particularly, relates to annular flow measurement devices and methods.

BACKGROUND OF THE INVENTION

Annular flow meters have been heretofore suggested and/or utilized (see U.S. Pat. Nos. 3,196,680, 4,638,672 and 1,126,275). These flow meters utilize a central disk or cone mounted in a pipe or conduit to divert fluid flow to the outside of the meter to produce a measurable differential pressure. Annular meters have the advantage of providing free drainage for heavy materials at the bottom of the pipe while at the same time, allowing lighter fluids to pass along the top of the pipe.

Use of such devices often requires that the accuracy, specifications, features, and installation requirements be confirmed with the manufacturer, which in many cases lack documentation as to their accuracy and performance characteristics, and requires a flow test calibration to determine an accurate flow coefficient upon set up. Flow test calibration of such heretofore known devices must be performed on the same fluid and at the same flowing conditions (pipe size and the like) to be of any value, and thus recalibration may also be often required in some facilities. Moreover, due to the wide range of user applications and the limited calibration facilities available to many users, the flow coefficient is quite often based only on the manufacturer's estimated value for various applications. As may be appreciated, such heretofore known annular flow meter designs may be unacceptable to many users due to questionable accuracy and/or requirements for calibration and recalibration.

In some such heretofore known annular flow meter designs, structural failure due to flow induced vibration, clogging of the low pressure ports and high signal to noise ratios have been experienced by users due to aerodynamic and fluid dynamic design shortcomings. The effects of boundary layers and attention to ideal flow theory in such meter designs have also often been overlooked.

For example, many of the previous annular flow meter designs have required structural support members located forward of the low pressure sensing ports. Such support members create upstream disturbance that destabilizes the fluid velocity profile and pressure distribution around the meter. Non-aerodynamic shapes utilized in some heretofore known designs produce high-pressure drag, high permanent pressure loss, and an increase in the possibility of destructive resonance and/or significantly greater flow induced vibration created by the alternate shedding of vortices.

Heretofore known annular flow meters have also often located their low pressure ports in the partial vacuum in the rear wake area of the annular flow inducing mechanism, after the fluid separates from the meter body. When thus positioned, ports collect dirt and are thereby subject to clogging, and can produce high signal noise induced by the alternate shedding of the vortices. The failure in most annular flow meter designs to control boundary layers (the layer that exists between the surface of the meter and the free stream velocity of the fluid, flow of which can be laminar or turbulent), permitting transition from laminar to turbulent flow adjacent to the pressure measuring port(s), results in unpredictability of pressure distribution and its corresponding flow coefficient.

Finally, heretofore known and/or utilized annular flow meters (as well as other venturi-type differential flow meters) are often unable to measure low velocity/Reynolds Numbers flow rates. Typically, such meters have an operation range (maximum flow/minimum flow), or turndown, of about 4 to 1. This is because, at low velocities, increase in laminar boundary layer thickness in the throat adjacent to the low pressure port causes the sensed pressure at the low pressure port to deviate from the true static pressure, and causes a corresponding rapid lowering of the flow coefficient. This results in a loss of accuracy when the flow coefficient deviates outside of the required accuracy band, and thus limits operating range.

As may be appreciated, further improvement in the field of annular flow measurement systems and methods could be utilized.

SUMMARY OF THE INVENTION

This invention provides devices, installations and methods for improved fluid flow measurement in a conduit utilizing annular flow. The devices and installations are demonstrably accurate, easy to install and use, require little or no calibration or recalibration, exhibit little design-induced vibration or measurement port clogging, have low signal to noise ratios, have no structural support members forward of the low pressure sensing port to disrupt the flow profile, and can measure both high and low velocity/Reynolds Numbers flow rates.

The device of this invention, for establishing annular fluid flow in a conduit, improves consistency and predictability of fluid flow measurements thereat. It includes a main body with a front portion having a constantly curvilinear flow facing surface and a rear portion. The rear portion has an upstream terminus and a downstream terminus, the termini having relatively larger and smaller diameters, respectively. A substantially constant diameter portion extends between the front portion and the relatively larger diameter upstream terminus of the rear portion. A retainer is located adjacent to the relatively smaller diameter downstream terminus of the rear portion to concentrically locate the main body in the conduit.

The installation of this invention includes a device for establishing annular fluid flow that has a main body and a retainer. The device is maintained in a pipe section having a substantially constant diameter substantially the same as diameter of the conduit where the installation is located. The device retainer is located at the body and the pipe section so that an unobstructed flow path is maintained in the pipe section upstream from the main body and so that an unobstructed annular flow path is established between the main body and the pipe section. The retainer is located at the pipe section so that a first pressure measurement port is one of upstream and facing upstream from the main body of the device and so that a second pressure measurement port is located at the annular flow path.

The devices, installations and methods of this invention provide measurement of fluid flow in a pipe or conduit maintaining a relatively constant and predictable flow coefficient with a minimum of upstream straight run conduit required and over a wide operating range.

The method steps for improved fluid flow measurement in a conduit of this invention include establishing at the conduit an unobstructed substantially constant diameter flow path having a first measurement port thereat. Adjacent to the constant diameter flow path, an unobstructed annular flow path is established downstream from the first measurement port, the outside diameter of the annular flow path and said constant diameter flow path being substantially equivalent. A second measurement port is established at a region of the annular flow path configured to stabilize and linearize velocity profile of fluid flowing thereat. The annular flow path is gradually expanded downstream from the second measurement port.

It is therefore an object of this invention to provide devices, installations and methods for improved fluid flow measurement in a conduit utilizing annular flow.

It is another object of this invention to provide devices and installations for improved fluid flow measurement in a conduit utilizing annular flow that are demonstrably accurate, easy to install and use, require no calibration or recalibration, exhibit little design-induced vibration or measurement port clogging, have low signal to noise ratios, have no structural support members forward of the low pressure sensing port, and that can measure both high and low velocity/Reynolds Numbers flow rates.

It is still another object of this invention to provide a device for establishing annular fluid flow in a conduit at a differential pressure measurement station that improves consistency and predictability of fluid flow measurement thereat.

It is another object of this invention to provide devices, installations and methods for improved fluid flow measurement in a conduit utilizing annular flow that maintain a relatively constant and predictable flow coefficient with a minimum of upstream straight run conduit required and over a wide operating range.

It is yet another object of this invention to provide a device for establishing annular fluid flow in a conduit at a differential pressure measurement station for improving consistency and predictability of fluid flow measurements, the device comprising a main body including a front portion having a constantly curvilinear flow facing surface, a rear portion having relatively larger and smaller diameter termini, and a substantially constant diameter portion extending between the front portion and the relatively larger diameter terminus of the rear portion, and a retainer located adjacent the relatively smaller diameter terminus of the rear portion of the main body to concentrically locate the main body in the conduit.

It is another object of this invention to provide an installation for improving fluid flow measurement in a conduit that includes a device for establishing annular fluid flow including a main body and a retainer, the device maintained in a pipe section having a substantially constant diameter that is substantially the same as diameter of the conduit, the retainer of the device located at the body and the pipe section so that an unobstructed flow path is maintained in the pipe section upstream from the main body of the device and so that an unobstructed annular flow path is established between the main body of the device and the pipe section, the retainer of the device located at the pipe section so that a first pressure measurement port is one of upstream and facing upstream from the main body of the device and so that a second pressure measurement port is located at annular flow path.

It is still another object of this invention to provide a method for improved fluid flow measurement in a conduit that includes the steps of establishing at the conduit an unobstructed substantially constant diameter flow path having a first measurement port thereat, establishing adjacent to the constant diameter flow path an unobstructed annular flow path downstream from the first measurement port, outside diameter of the annular flow path and the constant diameter flow path being substantially equivalent, providing a second measurement port at a region of the annular flow path configured to stabilize and linearize velocity profile of fluid flowing thereat, and gradually expanding the annular flow path downstream from the second measurement port.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
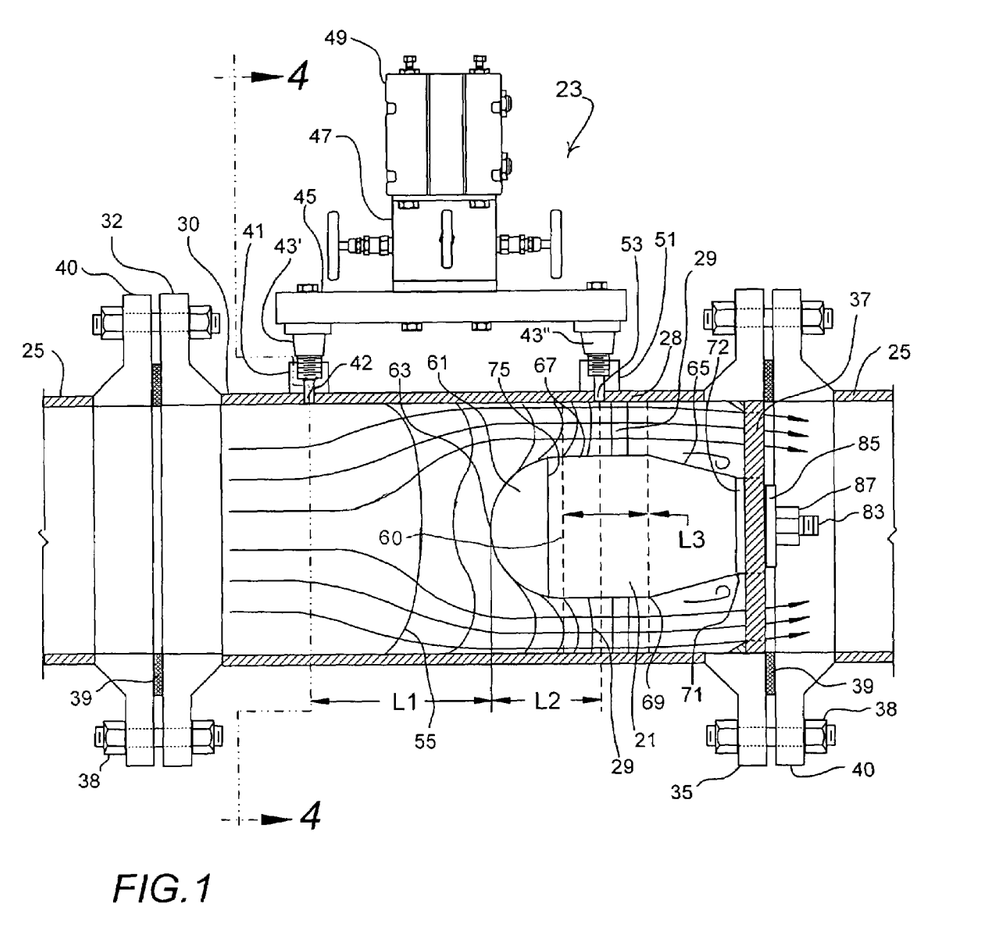
FIG. 1 is a partial sectional illustration showing a first embodiment of the device and installation of this invention.

FIG. 1 shows the now preferred embodiment of device 21 of this invention in installation 23 of this invention maintained in conduit 25. Installation 23 includes pipe or conduit section 28 affixed between sections of conduit 25. Device 21 is concentrically located in the otherwise unobstructed flow path defined by pipe section 28 and obstructs fluid flow thereat to establish annular flow therearound. As may be appreciated, the diameter of pipe section 28 is constant (i.e., corresponding to conduit 25 and without significant pipe wall constriction or expansion along its length), the outside diameter of annular flow path 29 established by device 28 being substantially equivalent to the diameter of pipe section 28, while the inside diameter of annular flow path 29 is variable with contours of device 21.

Pipe section 28 includes a length of pipe 30 held between (welded for example) means of attachment in conduit 25 (as shown in FIG. 1, flanges 32 and 35 welded to pipe 30, though other means could be utilized as discussed hereinbelow). Flange 35 has retainer 37 of device 21 mounted thereat (for example, by welding or other means as discussed hereinbelow). Stud and nut assemblies 38 compress a gasket 39 to seal the connecting flanges 32/35 at conduit flanges 40.

Weld coupling 41 is affixed to pipe 30, hole 42 drilled through pipe 30 and coupling 41 communicating the high or static pressure through adapter 43' to pressure communication plate 45, valve manifold 47 and differential pressure transmitter 49. In a like manner the low pressure is communicated through low-pressure weld coupling 51 and adapter 43". The high-pressure tap (hole 42) is preferably located at a predetermined distance L1 from the front of device 21.

The low-pressure tap (hole 53 at coupling 51) is located at a predetermined distance L2 from the front of the device 21 and at predetermine location within the straight settling zone at flow path 29 (defined at L3 in pipe section 28). As the typical velocity profile of the fluid flow (defined by the fluid flow front at line 55 in pipe section 28) reaches device 21, it is diverted into the settling zone L3 by device 21 where the velocity profile is stabilized and linearized.

Device 21 includes a main body 60 and retainer 37. Main body 60 includes a front portion 61 having a substantially constant curvilinear flow facing front surface 63 (without points or angles facing the fluid flow, front portion 61 of most embodiments characterizable as a hemispherical), rear portion 65, and a substantially constant diameter portion 67 between front portion 61 and rear portion 65.

Front surface 61 is of particular importance to the design of device 21, contributing significantly to control of the flow profile as the flow enters annular flow path 29. Rear portion 65 (a diffuser section) includes relatively larger and smaller diameter termini 69 and 71, respectively. Mounting portion 72 is located adjacent smaller diameter terminus 71 of rear potion 65. The diffuser section (rear portion 65) is preferably cone shaped to promote a gradual expansion of fluid flowing thereat to reduce the permanent pressure loss.

While a unitary construction is preferred for device 21 (cast, molded, milled or the like), plural independent, assembled portions could be used to form device 21. Tripwire ring 75 (an elevated structure or roughened area formed or mounted on the surface of front portion 61) is affixed (or defined) around front portion 61 at or just forward of the transition to constant diameter portion 67 to insure that a boundary layer of the fluid flow passing over it will be "tripped" and become turbulent (resulting in more predictable flow at annular flow path 29).

Retainer 37 is affixed within or adjacent to flange 35, and is configured (see FIG. 3) to concentrically locate device 21 within pipe section 28. While retainer 37 could be secured by more permanent means (welding, monolithic fabrication, or the like), releasable securement in pipe section 28 is preferred.

Figure 2:
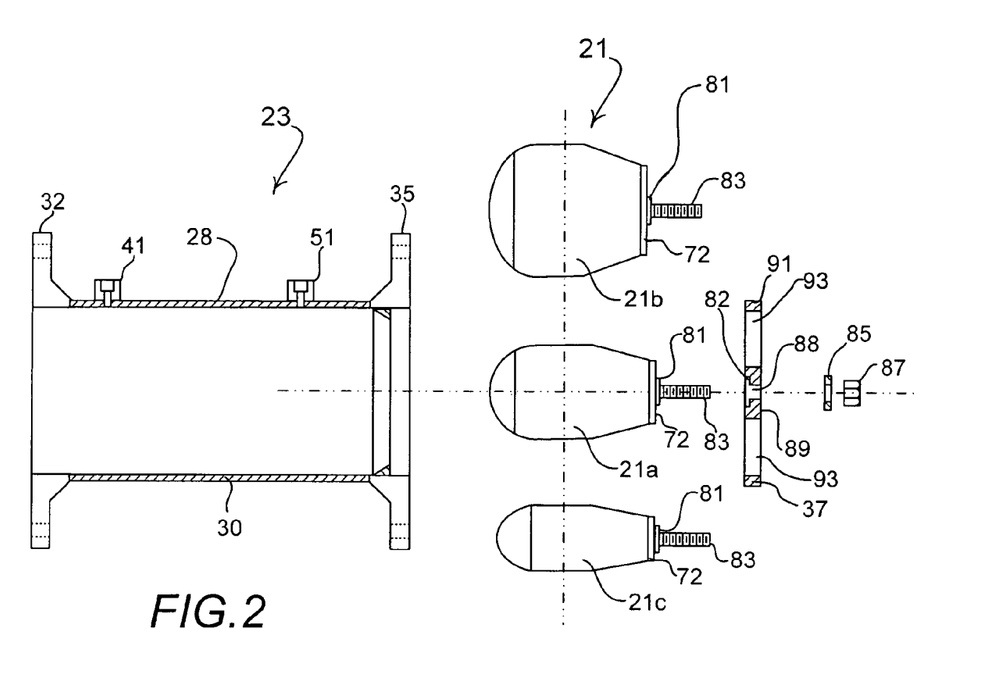
FIG. 2 is an illustration showing devices of this invention interchangeable in the installation of this invention.
Figure 3:
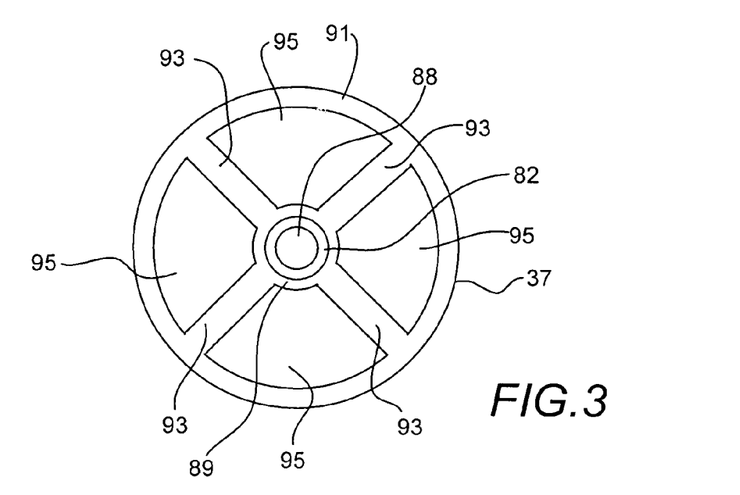
FIG. 3 is a top view of the retainer of the device of this invention shown in FIG. 1.
Figure 4:
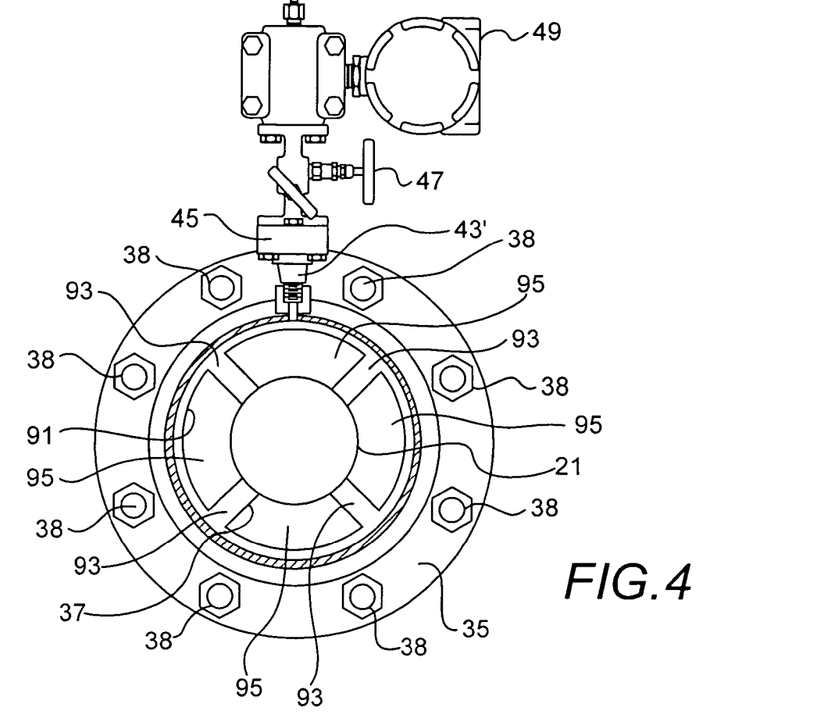
FIG. 4 is a sectional view taken through section lines 4—4 of FIG. 1.

Turning now also to FIGS. 2 through 4, mounting portion 72 of main body 60 of device 21 includes smaller diameter hub 81 that engages counter bore 82 in retainer 37 for locating device 21 concentrically with respect to retainer 37. Threaded stud 83 extends from mounting portion 72, washer 85 and nut 87 being affixable at stud 83 to secure device 21 at opening 88 at retainer 37. Retainer 37 includes central mount 89 having counter bore 82 and opening 88 thereat, outer locator ring 91, and support struts 93 between mount 89 and locator ring 91 (four struts are shown though more or fewer supports could be utilized, configuration of the supports being a matter of design choice and flow requirements). Openings 95 are thus defined within retainer 37 to permit the flow of fluid through the meter.

As shown in FIG. 2, installation 23 can accommodate different interchangeable devices 21 (21a, 21b or 21c, for example), the devices having different diameters for different flow conditions. Exchanging device 21a for device 21c, for example, in a given pipe section 28 alters the inside diameter (and thus the cross sectional area) of annular flow path 29 (see FIG. 1).

Figure 5:
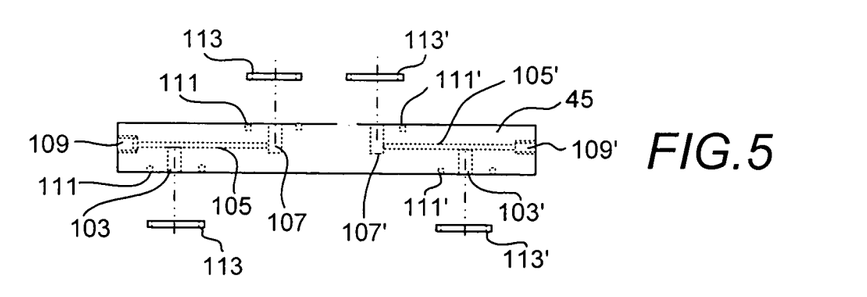
FIG. 5 is an exploded side view illustration of a pressure communication plate used in the installation of this invention.
Figure 6:
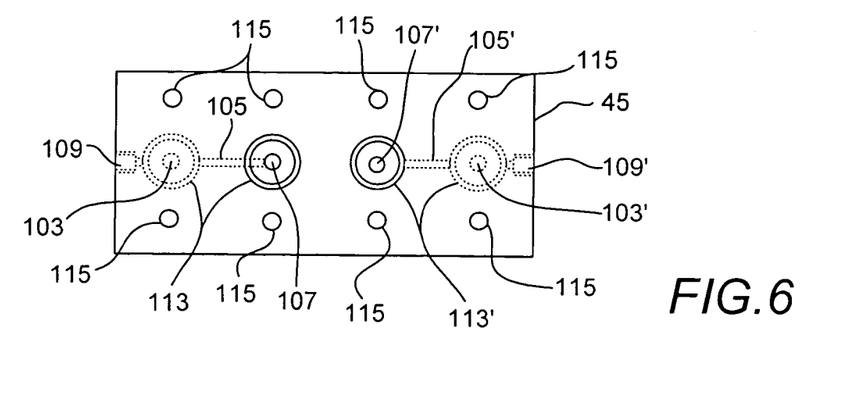
FIG. 6 is a top view illustrating the pressure communication plate of FIG. 5.

Pressure communication plate 45 shown in FIGS. 5 and 6 communicates the high and low-pressure signals to valve manifold 47 and transducer/transmitter 49 (through the various passageways shown in dotted line). This design permits the direct mounting of valve manifold 47 and transducer 49 to the meter without the expense of connecting tubing. The high pressure is communicated through an adapter (43' in FIG. 4) to opening 103 and then into passages 105 and 107. Passage 105 is sealed by set screw 109. Circular slots 111 receive gaskets 113 to seal high the pressure passage between opening 103 and passage 107 and adapter 43' and valve manifold 47, respectively. In a like manner, the low-pressure is communicated through opening 103' and passages 105' and 107'. Passage 105' is sealed by set screw 109', and slots 111' receive gaskets 113' to seal the openings. Bolt holes 115 are used to fasten manifold 47 (and, on the bottom of plate 45, adapters 43'/43", not shown) to pressure communication plate 45.

Although not shown, pressure communication plate 45 can be configured to receive two valve manifolds 47 and transducers/transmitters 49 to extend the rangeability, or turndown, of the meter.

Figure 7:
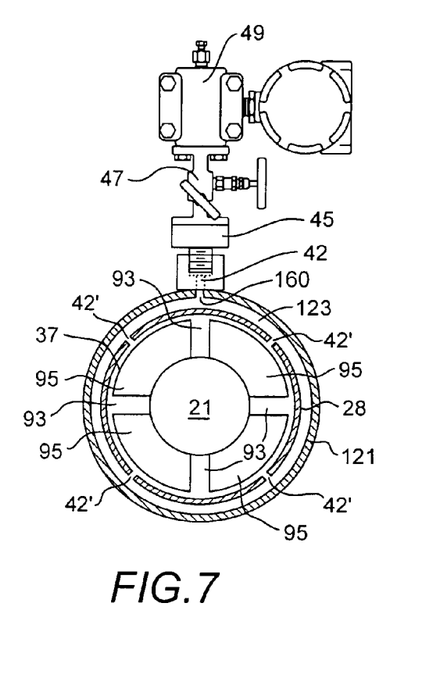
FIG. 7 is a partial sectional illustration showing a second embodiment of the installation of this invention.
Figure 8:
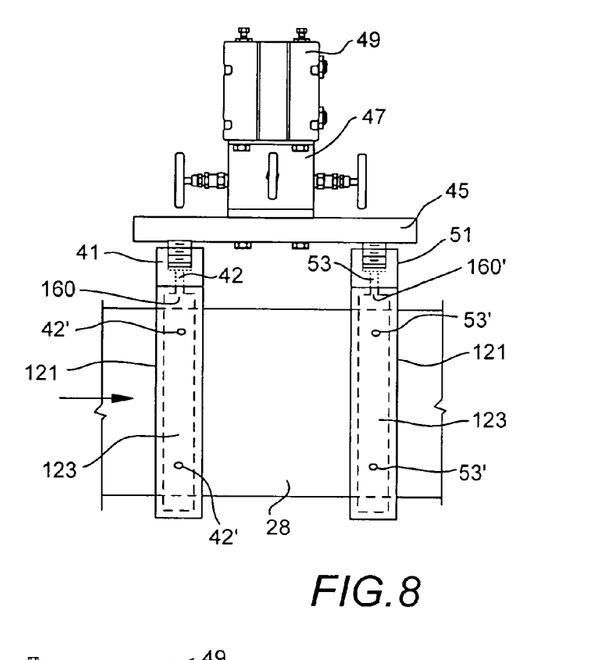
FIG. 8 is a side view illustration of the installation of FIG. 7.

Another embodiment of the installation of this invention is shown in FIGS. 7 and 8 wherein multiple high and low pressure taps 42' and 53', respectively, are applied at the single taps 42 and 53, respectively, communicating through pressure communication plate 45. Rings 121 are affixed to pipe section 28 forming pressure tight chambers 123 around the circumference of the pipe section 28. Multiple holes (taps) 42' and 53' communicate the high and low pressures, respectively, through pipe section 28 to chambers 123, each chamber further communicated (as an average pressure) to openings 160 and 160' to taps 42 and 53, respectively. This configuration functions to average the high pressures to produce more accurate measurement when the velocity profile is asymmetrical or distorted by the upstream piping configuration, valves and/or fittings.

Figure 9:
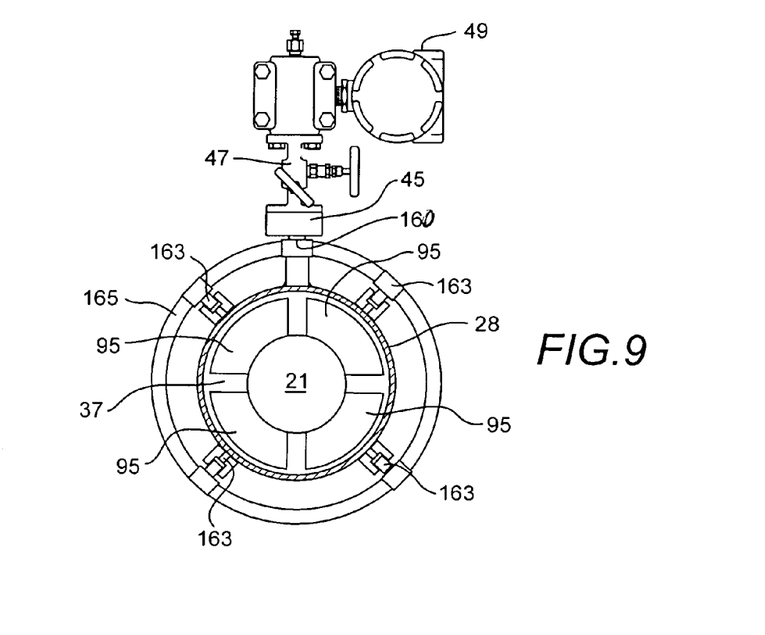
FIG. 9 is a partial sectional illustration showing a third embodiment of the installation of this invention.

Still another embodiment of the installation of this invention is shown in FIG. 9, which installation in similar in purpose to the embodiment shown in FIGS. 7 and 8. The only distinction illustrated is an alternative method of connecting multiple high and low pressure ports (42' and 53', though only 42' are illustrated) using tube fittings 163 and tubing ring 165 to opening 160 (and 160') to taps 42 and 53.

Figure 10:
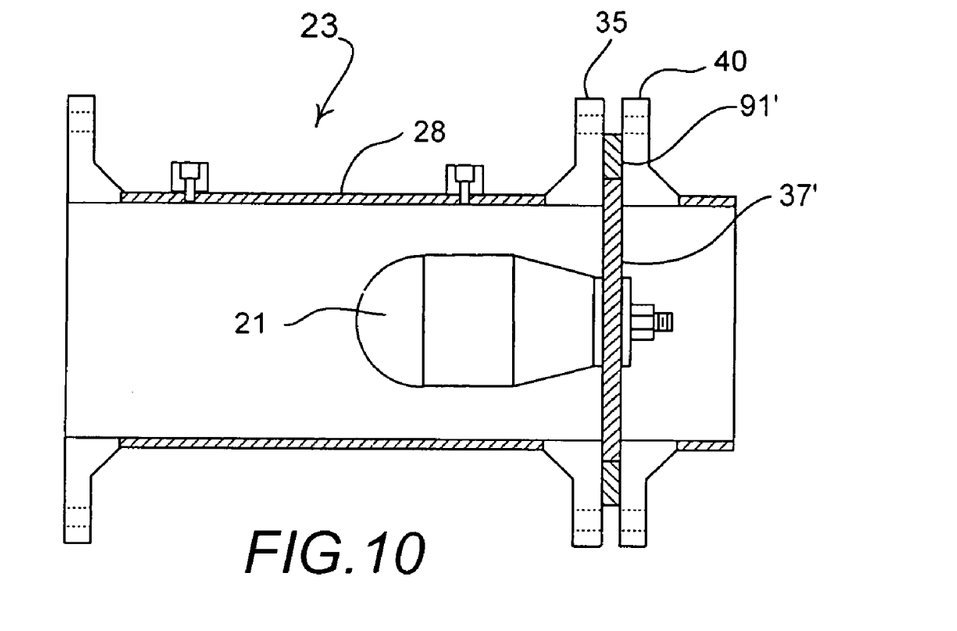
FIG. 10 is a partial sectional illustration showing one means of mounting the device of this invention and the installation of this invention at a conduit.
Figure 11:
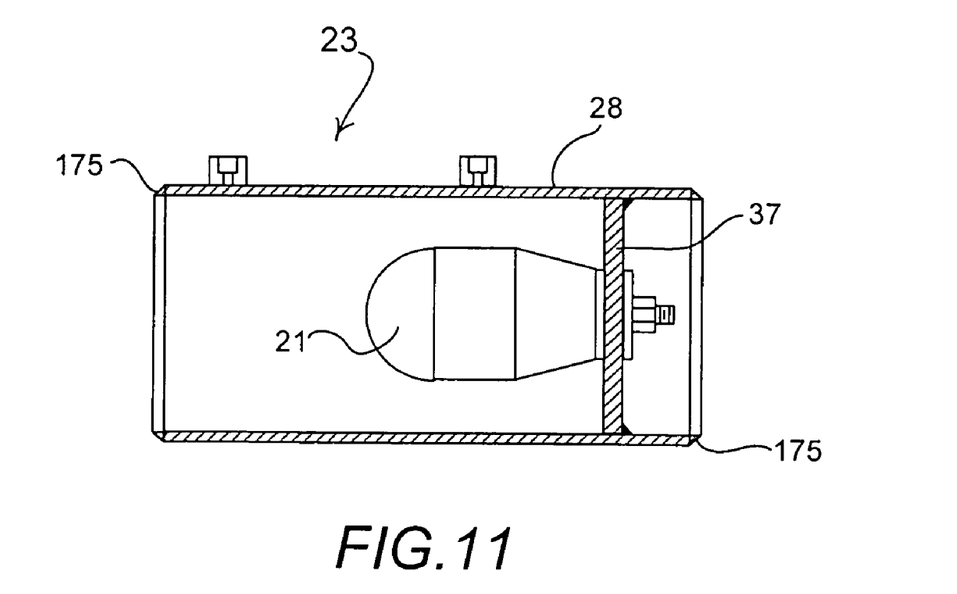
FIG. 11 is a partial sectional illustration showing the device and installation of this invention configured for mounting in a conduit utilizing a different means.

FIG. 10 illustrates an alternative method for mounting a specifically adapted retainer 371 (at the expanded diameter locator ring 91') between flanges 35 and 40 for retention of device 21 concentrically within pipe section 28. This design is particularly well adapted for ease of removal and exchange of device 21 from installation 23. FIG. 11 illustrates an alternative configuration of pipe section 28 adapted for mounting thereof at a conduit when the application requires a butt weld. In such case, flanges are replaced by weld adapted connection surfaces 175.

Figure 12:
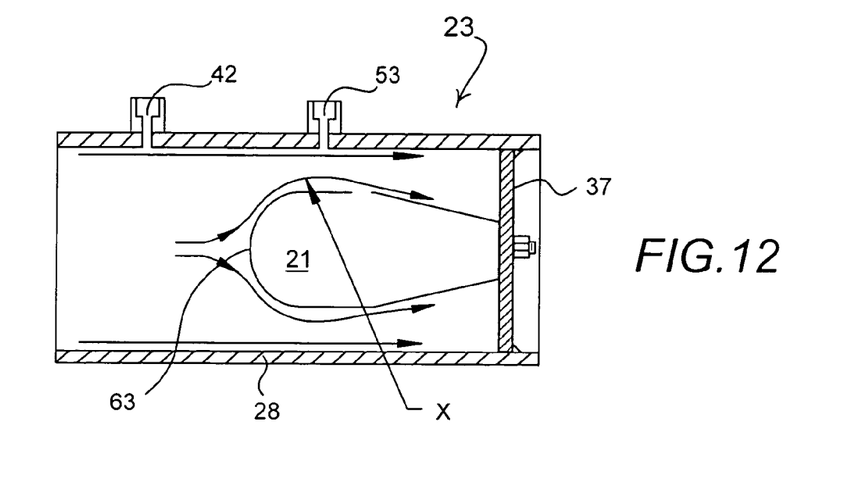
FIG. 12 is a sectional view of the device and installation of this invention illustrating flow effects evidenced in use thereof.

FIG. 12 shows the absence of effects on the low-pressure signals from port/tap 53 caused by increasing fluid boundary layer thickness acting on the flow at X when utilizing device 21 of this invention having the constantly curvilinear surface 63 configuration discussed herein and present in all embodiments of device 21.

Figure 13:
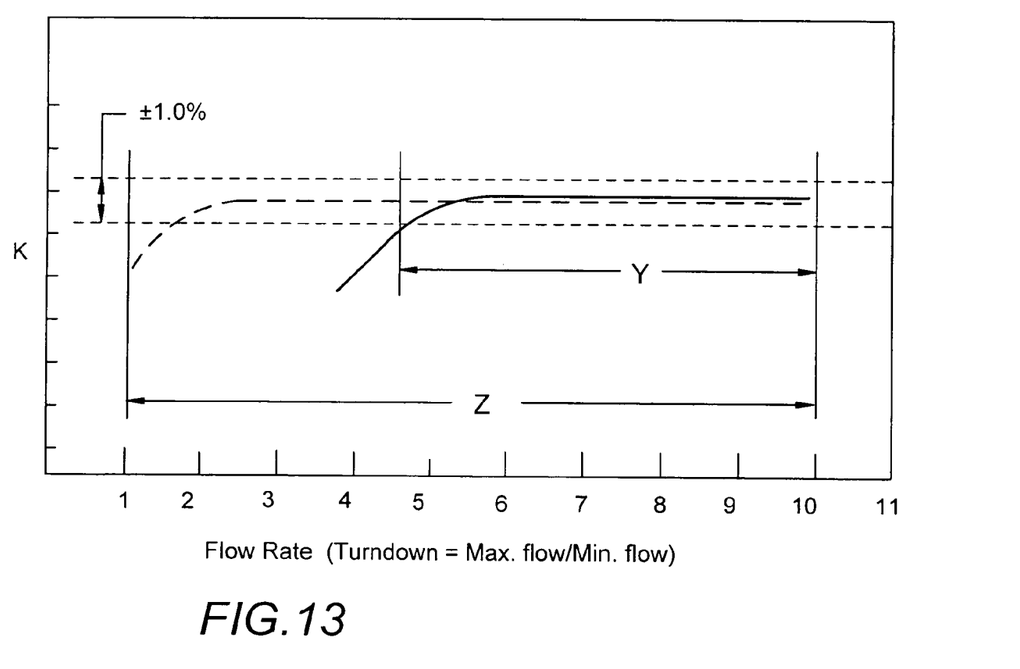
FIG. 13 is a graph showing the operating range of an installation of this invention compared with a standard-type venturi installation.

FIG. 13 is a graph plotting data representative of the operating ranges (turndown) Y and Z of a standard configuration venturi (solid plot line) and device 21 of this invention (dashed plot line), respectively. As can be seen, utilization of the device of this invention greatly enhances the range of operation of the installation.

Figure 14:
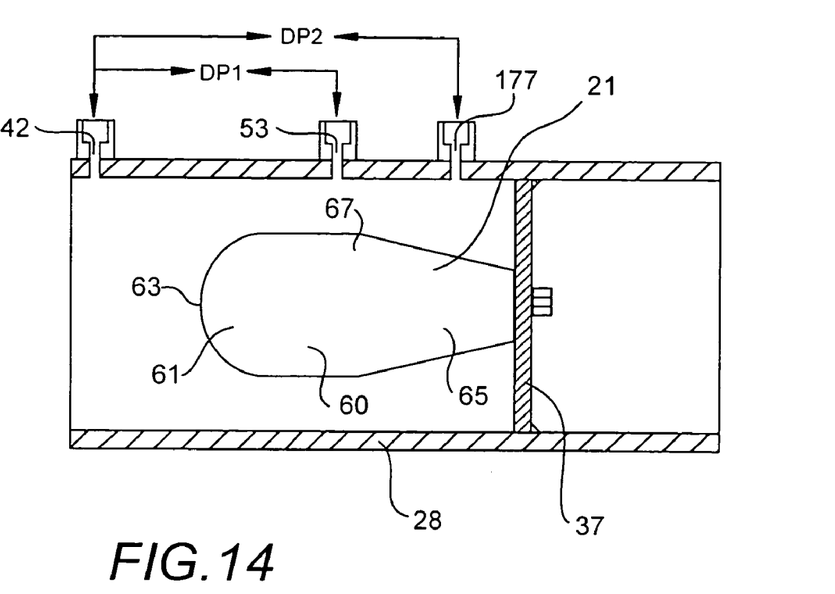
FIG. 14 is a partial sectional illustration showing a fourth embodiment of the installation of this invention.

Yet another embodiment of the installation of this invention is illustrated in FIG. 14 particularly adapted for fluid flow measurements with wet gasses. In this embodiment, the only change is the addition of another low pressure tap 177 at pipe section 28 (and configured as discussed hereinabove with respect to the other pressure taps). Tap 177 is located opposite rear portion 65 of body 60 of device 21 and is used to determine a second differential pressure (DP2) and a third differential pressure DP3 (DP1–DP2) in addition to the differential pressure DP1 reading achieved in the embodiment of the invention shown in FIG. 1.

Utilizing this embodiment, accurate measurement of the flow rate of a fluid stream that contains both liquid and gas (known as two phase flow) can be achieved. Two phase flow is difficult to measure because of the physical differences between a liquid and a gas. A liquid is typically 1000 times more dense and 50 time more viscous than a gas. Thus liquid flows along the bottom of a conduit at a much lower velocity than the gas entrained therewith (i.e., stratified flow). Stratified flow has heretofore caused almost all measurement devices to over estimate the total flow in the conduit, with greater percentage of liquid in the flow increasing the error.

Figure 15:
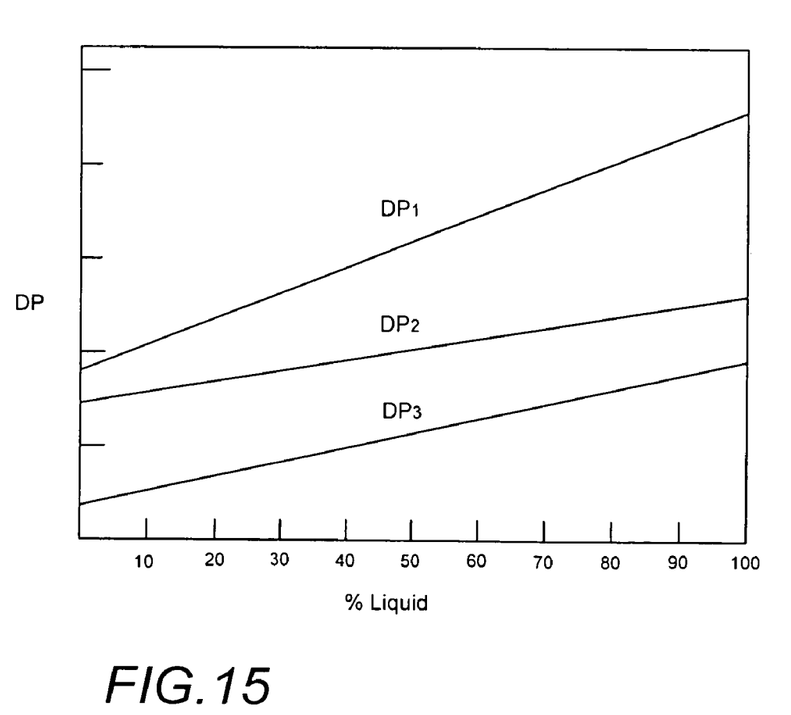
FIG. 15 is a graph showing relationships between differential pressure readings realized utilizing the installation of FIG. 14 with various wet gas fluid flows.

The percent of liquid entrained in a gas/liquid mixture can be derived from measuring two differential pressures for two different body diameters (blockages). As the gas/liquid mixture accelerates and expands into a smaller throat area the static pressure will decrease. As the pressure decreases the specific humidity of the gas will increase causing some of the liquid to precipitate from the gaseous phase. This aspirated liquid increases the "apparent density" of the gas. Because the sensed differential pressure is related to the density of the gas, the increased apparent density causes the sensed differential pressure to increase. If the differential pressure is measured for two blockages, the difference between the two differential pressures will be a function of percent moisture (the greater the percentage of moisture, the greater is DP3). By calculating DP3, the percent liquid as a function of DP3 can be determined and utilized to correct the uncorrected flow rate derived from DP1. FIG. 15 is a graph showing the differential pressure relationships between DP1, DP2 and DP3 relative to percentage of liquid found in a wet gas.

Figure 16:
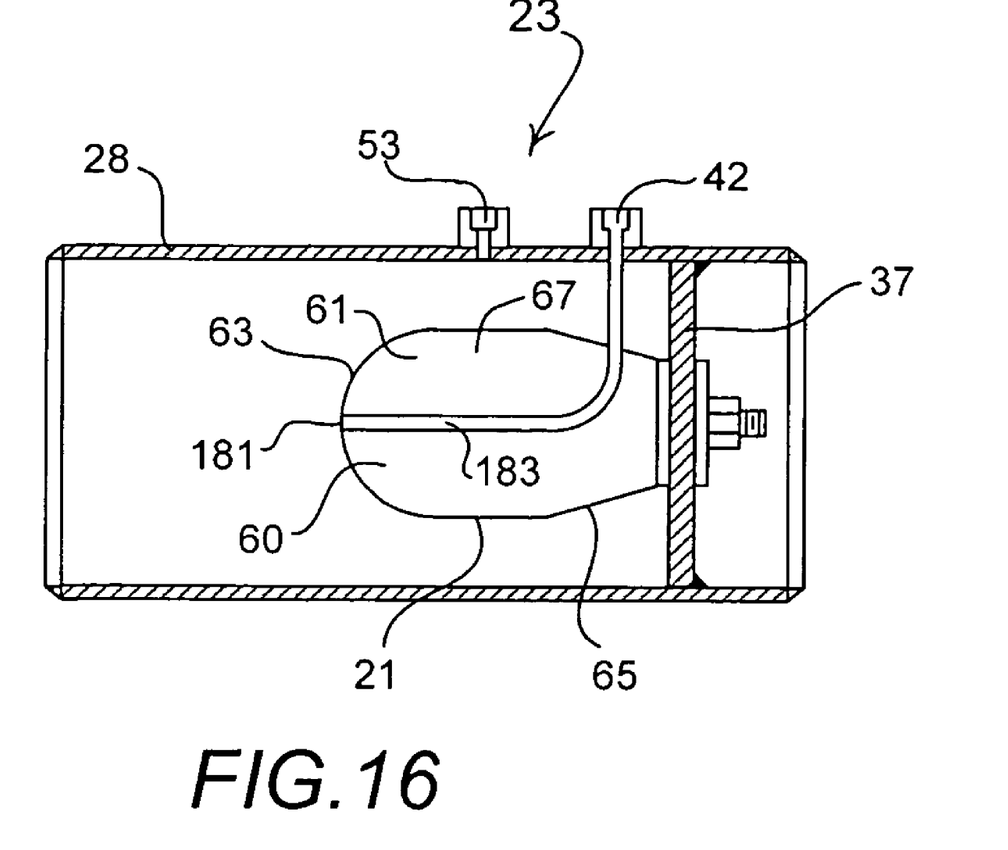
FIG. 16 is a partial sectional illustration showing yet another embodiment of the device and installation of this invention.

Still another embodiment of the installation and device of this invention are illustrated in FIG. 16 wherein main body 60 of device 21 includes high pressure tap 42 communicating therethrough. Concentrically located opening 181 (concentric relative to surface 61 of front portion 63) faces upstream from device body 60 and communicates through channel 183 thus in combination providing the high pressure port of tap 42. Low pressure tap 53 is positioned as before. While channel 183 is shown communicating at tap 42 through piping extending form device 21, it might be preferable for the vertical leg of channel 183 to be formed through retainer 37 (at a strut 93 thereof, for example).

As may be appreciated from the foregoing, an improved flow measuring installation and annular flow inducing device are disclosed that, are aerodynamically designed to reduce pressure drag, force applied to the meter body and the structural support members, and permanent pressure loss. The design reduces the lateral forces applied to the meter body by the shedding of vortices and thus the affect of flow induced vibration and destructive resonance frequencies.

A turbulent boundary layer is triggered at the entry to the annular flow region, thus improving the predictability of drag coefficient and corresponding flow coefficient. This boundary layer control aids production of a constant flow coefficient independent of Reynolds Number and velocity, lowers the pressure drag and reduces the intensity of the vortices being shed from the device of this invention thus lowering the forces applied to structural support members and producing more stable pressure signals.

The annular flow inducing body of the device of this invention includes a straight (constant diameter) length to provide a settling zone in the annular flow path. Such construction stabilizes and linearizes the velocity profile of the flow, reduces the effects caused by asymmetrical, non-linear, velocity profiles produced by upstream piping configurations, fittings and valves, and insures that the low-pressure signal is stable and has a high signal to noise ratio, usually greater than 100:1. Without such construction, a length of straight running conduit equivalent to as many as seven to 24 conduit diameters upstream of the flow meter is required to maintain flow meter accuracy. Provision herein of such a settling zone, however, reduces the upstream straight run requirements by more the 60% (requiring straight run of as little as only three to five conduit diameters).

The device of this invention includes a diffuser portion having a gradually reducing diameter after the settling zone to reduce the permanent pressure loss by 30% to 50%. Permanent pressure loss is directly related to operating (energy) costs of the meter, and savings associated with this design can be calculated by converting the permanent pressure loss to an equivalent amount of horsepower and the cost to produce it.

The retainer utilized by the device of this invention for mounting thereof in a pipe section provides the sole support for the device in the pipe section, and is located downstream of the body of the device and both the high pressure and low pressure measurement taps. This insures that there is no obstruction forward of the pressure measurement taps, resulting in improved accuracy and repeatability of measurements (by eliminating an unpredictable variable—upstream flow disturbances that unbalance the fluid velocity profile and pressure distribution around the meter).

The design permits interchanging of different diameter annular flow inducing devices. The diameter of a selected device related to the internal diameter of the pipe section where located, commonly designated as the beta ratio, determines the operating range of the meter based on the flow conditions. The design of this invention accommodates change of flow conditions by allowing installation of a device producing a different beta ratio to resize the installation to a new operating range without replacement of the entire meter.

The design of the installation of this invention permits the utilization of a mathematical model (utilizing the relationship between flow rate and differential pressure, and verified by flow testing) to predict flow coefficients over a wide range of pipe sizes and Reynolds Numbers thus eliminating the need for expensive calibration in previously untested pipe sizes. By utilization of the annular venturi design disclosed herein, laminar boundary layer thickness increases acting on the device of this invention do not effect the differential pressure signal. This permits accurate installation operation for this invention with flow turndowns in excess of 10:1.

What is claimed is:

1. A device for establishing annular fluid flow in a conduit at a differential pressure measurement station for improving consistency and predictability of fluid flow measurements, said device comprising:
    a main body including a front spherical portion having a constantly curvilinear flow facing surface configured to substantially obstruct and redirect fluid flow thereat, a rear portion having relatively larger and smaller diameter termini, and a substantially constant diameter portion extending from behind said front spherical portion to said relatively larger diameter terminus of said rear portion; and
    a retainer located adjacent said relatively smaller diameter terminus of said rear portion of said main body to concentrically locate said main body in the conduit.

2. The device of claim 1 wherein said front portion is hemispherical.

3. The device of claim 1 wherein said front portion includes a ring thereat for causing laminar fluid boundary layer turbulence.

4. The device of claim 1 wherein said main body and said retainer are configured so that said main body is readily releasable from said retainer so that main bodies having different diameters can be interchanged at the measurement station.

5. The device of claim 1 wherein said main body further includes a mounting portion at said relatively smaller diameter terminus of said rear portion of said main body having a hub thereat, and wherein said retainer includes a bore corresponding to said hub to thereby concentrically locate said main body relative to said retainer.

6. The device of claim 1 wherein said main body includes a stud adjacent said relatively smaller diameter terminus of said rear portion of said main body, said stud receivable through an opening through said retainer.

7. The device of claim 1 wherein said retainer includes a central mount for securement with said main body, an outer locator ring, and at least a first support extending between said mount and said locator ring.

8. An installation for improving fluid flow measurement in a conduit comprising a device for establishing annular fluid flow including a main body and a retainer, said device maintained in a pipe section having a substantially constant diameter that is substantially the same as diameter of the conduit, said retainer of said device located at said main body and said pipe section so that an unobstructed flow path is maintained in said pipe section upstream from said main body of said device and so that an unobstructed annular flow path is established between said main body of said device and said pipe section, said retainer of said device located at said pipe section so that a first pressure measurement port is one of upstream and facing upstream from said main body of said device and so that a second pressure measurement port is located at said annular flow path, said main body of said device including a front spherical portion without points or angles facing into said unobstructed flow path in said pipe section to direct flow to said annular flow path and control flow profile entering said annular flow path.

9. The installation of claim 8 wherein said front spherical Portion of said main body of said device is characterized by a constantly curvilinear flow facing front surface.

10. The installation of claim 8 wherein said main body of said device is characterized by a substantially constant diameter portion located at said annular flow path opposite said second port and having a length selected so that velocity profile of fluid flowing thereat is stabilized and linearized.

11. The installation of claim 8 wherein said main body of said device is characterized by a rear portion having relatively larger upstream and smaller downstream diameter termini to allow gradual expansion of fluid flowing thereat and thus reduce permanent pressure loss in the conduit.

12. The installation of claim 11 further comprising a third port in said pipe section upstream from said retainer and downstream from said second port, said third port adjacent to said annular flow path opposite said rear portion of said main body of said device.

13. The installation of claim 8 wherein said retainer of said device includes a central mount and an outer locator ring for securement at said pipe section, at least one of said main body and said central mount of said retainer including a stud and the other of said main body and said central mount of said retainer including an opening to accommodate releasable securement of said main body to said retainer.

14. The installation of claim 8 further comprising at least one additional first measurement port and at least one additional second pressure measurement port, all said first ports positioned upstream from said main body and all said second ports positioned at said annular flow path.

15. A method for improved fluid flow measurement in a conduit comprising the steps of:
    establishing at the conduit an unobstructed substantially constant diameter flow path having a first measurement port thereat;
    establishing immediately adjacent to said constant diameter flow path an unobstructed annular flow path downstream from said first measurement port by concentrically locating a spherical obstruction facing said constant diameter flow path, outside diameter of said annular flow path and said constant diameter flow path being substantially equivalent;
    providing a second measurement port at a region of said annular flow path configured to stabilize and linearize velocity profile of fluid flowing thereat; and
    gradually expanding said annular flow path downstream from said second measurement port.

16. The method of claim 15 wherein said spherical obstruction is characterized by a constantly curvilinear flow facing surface.

17. The method of claim 15 further comprising providing a third measurement port downstream from said second measurement port at a region of gradual expansion of said annular flow path.

18. The method of claim 15 wherein the steps of establishing an annular flow path and providing a second measurement port at a region of said annular flow path include following said obstruction with a substantially constant diameter portion in said constant diameter flow path and selecting length of said constant diameter portion of said obstruction to optimize stabilization and linearization.

19. The method of claim 15 further comprising causing laminar fluid boundary layer turbulence upon fluid entry to said annular flow path.

20. The method of claim 15 further comprising selectively altering inside diameter of said annular flow path.

21. The method of claim 15 further comprising reducing upstream straight run requirements for the conduit in advance of said first measurement port to as little as about three to five conduit diameters.

22. The method of claim 15 further comprising establishing flow coefficient prediction based on modeling thus eliminating the need for calibration.

23. The method of claim 22 wherein said flow coefficient remains constant, independent of Reynolds Number, over an operating range between maximum flow and minimum flow up to and exceeding about 10:1.

* * * * *